(12) United States Patent
Mackay-Smith et al.

(10) Patent No.: US 7,562,668 B2
(45) Date of Patent: Jul. 21, 2009

(54) EXCESS FLOW VALVES

(75) Inventors: Seth W. Mackay-Smith, Coatsville, PA (US); C. Dean McGowan, Malvern, PA (US)

(73) Assignee: UMAC Incorporated, Malvern, PA (US)

( * ) Notice: Subject to any disclaimer, the term of this patent is extended or adjusted under 35 U.S.C. 154(b) by 233 days.

(21) Appl. No.: 11/411,090

(22) Filed: Apr. 26, 2006

(65) Prior Publication Data

US 2007/0267075 A1 Nov. 22, 2007

(51) Int. Cl.
*F16K 5/10* (2006.01)

(52) U.S. Cl. .............................. 137/15.08; 137/315.11; 137/517

(58) Field of Classification Search .................. 137/517, 137/498, 315.11, 15.08, 15.15, 15.18
See application file for complete search history.

(56) References Cited

U.S. PATENT DOCUMENTS

| | | | | |
|---|---|---|---|---|
| 4,958,657 A | * | 9/1990 | Hagan et al. | 137/513.5 |
| 5,427,153 A | * | 6/1995 | Tash | 138/93 |
| 5,465,751 A | * | 11/1995 | Newton | 137/498 |
| 5,476,344 A | * | 12/1995 | Nordvall | 405/269 |
| 6,019,115 A | * | 2/2000 | Sanders | 137/10 |
| 6,814,101 B2 | | 11/2004 | Flauzac | |

\* cited by examiner

*Primary Examiner*—Kevin L Lee
(74) *Attorney, Agent, or Firm*—Browdy and Neimark, P.L.L.C.

(57) ABSTRACT

An excess flow valve (EFV) for installation in a service line of natural gas distribution system serving an existing structure. The EFV has a cylindrical housing having a first length and a second length and a through hole therethrough for passage of gas. The EFV 11 engaged in the through hole of the first length and the second length has an expandable wall which can be expanded and fixed in said service line.

27 Claims, 5 Drawing Sheets

EXCESS FLOW VALVES

BACKGROUND OF THE INVENTION

1. Field of the Invention

The present invention relates to a pipeline excess flow valve (EFV) and its retrofitting with compatible installation equipment into an existing gas service line.

2. Prior Art

Conventional combustible gas distribution systems bring gas from a street main below ground level, through a tapping tee, a service line, a riser above ground level, a meter cock, a regulator, a meter and then into the customer's structure. An example of such system is shown in FIG. 1.

Rupture of the line or failure of fittings between the consumer property line and the served customer structure can occur for any number of reasons. Among these are digging by the customer or other party, vehicular impact, ground settling, failure of a regulator, failure of a meter, failure of fittings and earthquakes. Rupture of the line or failure of fittings can also occur on the inside customer fuel gas piping or flexible connection. Dangerous explosive conditions can arise when any such rupture occurs.

Prior art patents show various structures for shutting off the gas flow when the flow exceeds a predetermined value, e.g. due to the downstream rupture. Excess flow valves are used in the natural gas industry to prevent explosive pipeline gases such as natural gas, propane, methane, coal gas, town gas, etc. from escaping when a pipe is ruptured. These safety valves will remain open during normal use, when there is backpressure downstream from the valve, but will trip (snap shut) when the downstream pressure disappears. This prevents fires and explosions when gas lines are ruptured.

In operation, the stem of a conventional EFV such as that shown in U.S. Pat. No. 5,551,476 is spring biased opposite to the direction of gas flow. Under normal conditions the poppet on the stem is held away from a valve seat by the bias spring. When the flow is excessive such as when the service line ruptures downstream of the EFV, the forces from the flowing fluid overcome the spring bias and the poppet closes against the seat, shutting off the flow. Thus, the dangerous flow of combustible gas is stopped.

Presently, in order to install an EFV in an existing service line a hole or trench must be dug, the service line pressure must be reduced to zero, and the service line must be cut. This is not only expensive, time consuming, and disruptive to customers and traffic flows, it is also impractical in terms of the human resources required.

The main technology barriers to retrofitting EFVs without digging have been the actual anchoring of the device in the service line. The anchoring of the device has been an issue since it is unacceptable to damage or otherwise alter the interior wall of the service piping. The method of insertion has been an issue because the valves and fittings attached to the meter set have unpredictable geometry and the bend in the service riser presents a constraint in terms of the length of the EFV and the rigidity of the installation tool.

OBJECT AND SUMMARY OF THE INVENTION

The object of the present invention is directed to a unique EFV and installation equipment engaged to the EFV during its installation which together overcome the deficiencies and problems in the prior art discussed above. The compatible EFV and installation equipment provides a new solution for retrofitting EFVs in service lines that involves no digging, thereby causing far less disruption to the community. The installation is effected from the customer meter set, using a hydraulically expandable element integral with the EFV that anchors the EFV inside the existing service line by the force of an interference fit.

A primary feature of the engaged EFV and compatible installation equipment provides an external geometry that is initially smaller in diameter than that of the inner diameter of the service line in which the EFV is to be installed. This permits passage of the EFV through the service line and its appurtenances to the point of installation without damage.

When the EFV has been inserted to a predetermined point in the service line, it can be expanded to the diameter needed for secure anchoring. The EFV is made of a material that allows for enough expansion to anchor the EFV without cracking, splitting, or otherwise deforming in an irregular manner. Put simply, this portion of the EFV is blown up like a balloon.

The method for the actual hydraulic expansion is and has been for some time in the public domain in the form of a method of power plant steam turbine condenser tube sleeving (repair), however the concept for using this for anchoring an EFV is entirely new and constitutes a secondary component of this original idea and application.

The installation equipment consists of a hydraulic pump, a flexible water line, and a mandrel that slides into the unique hydraulically expandable element of the EFV. The anchoring force, measured by a pressure gauge on the installation equipment, is high enough that the mandrel can simply be pulled out of the EFV when the expansion cycle is finished.

Thus, the features of the EFV according to the invention in cooperation with its installation equipment are intended to permit a user to:

(1) Retrofit the EFV in the customer's meter piping while the service line remains pressurized.
(2) Insert the EFV through the service line up to the tee that is attached to the gas main, and
(3) Use hydraulic pressure to expand a specific portion of the EFV so as to contact the inside of the service line and lock the EFV in place.

Though the device is metal, its design would be such that the metal expands much like a balloon under the applied pressure. This would have the further benefit of insuring that no sharp edges are in contact with a plastic service line.

As indicated above, installation equipment consists of a hydraulic pump, a flexible water line and a mandrel that slides into engagement with the hydraulically expandable element of the EFV. The anchoring force, measured by a pressure gauge on the installation equipment, indicates when the expandable element has expanded to contact the service line. Thereafter, the mandrel can be withdrawn out of the EFV when the expansion cycle has ended.

BRIEF DESCRIPTION OF THE DRAWINGS

Other objects and the nature and advantages of the present invention will be more apparent from the following detailed description of an embodiment taken in conjunction with the following drawings, wherein.

DETAILED DESCRIPTION OF THE PREFERRED EMBODIMENT OF THE INVENTION

Figure 1:
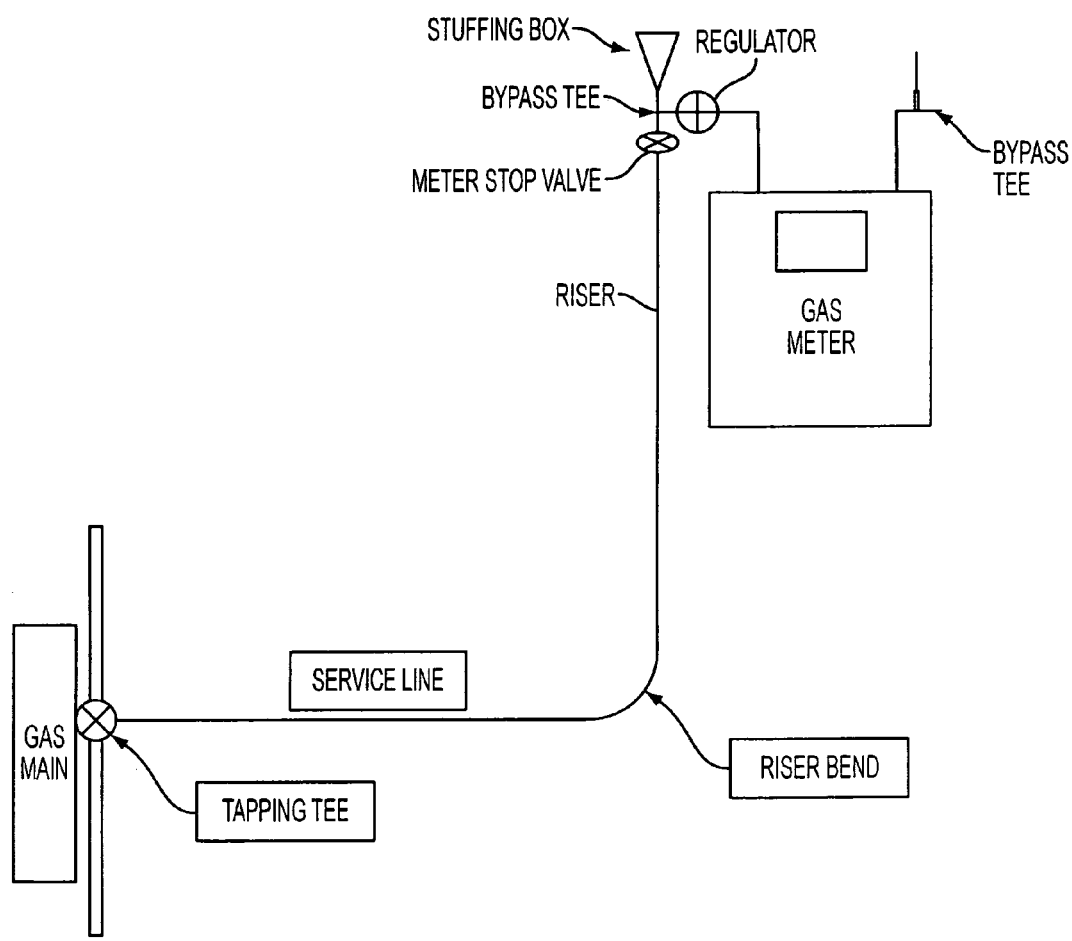
FIG. 1 shows a conventional natural gas distribution system.
Figure 2:
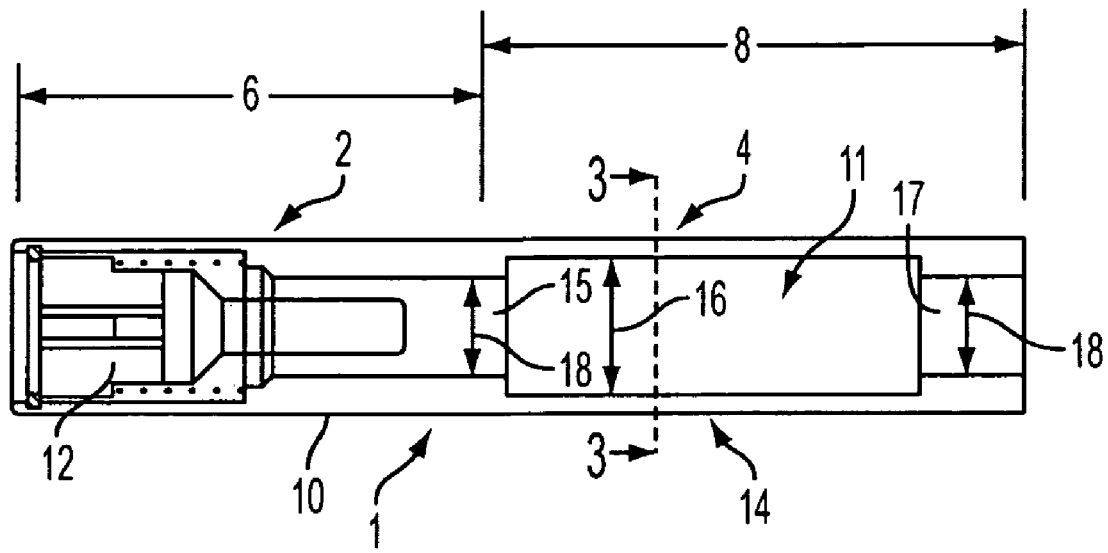
FIG. 2 shows an elevation view of the EFV according to the invention before its use.

EFV 1 shown in FIG. 2 is intended for installation in an existing conventional natural gas service system such as that shown in FIG. 1 to prevent escaping gas entering the home of a customer from a ruptured gas line downstream from the gas meter. The distribution system of FIG. 1 is shown connected between a tapping tee on a gas main and a gas meter located in the home of the customer. The service line shown in the system is normally buried after these connections have been made.

Installation of the EFV 1 is accomplished by inserting it through the bypass tee shown in FIG. 1 on the inlet side of the gas meter and fixing it to the inner wall of the gas pipe which extends to the gas main. Insertion under pressure is accomplished by way of a "stuffing box", a conventional device that consists of a sealed chamber which is attached to the bypass tee and allows control of a sliding rod or cable (not shown). One end of the rod or cable is outside of the stuffing box, allowing direct control by the operator while the opposite end is sealed inside the pressurized system. The seal is maintained via a gland nut and elastomer that compresses around the rod or cable when the nut is tightened. Such a device is well known within the industry and accordingly not an inventive feature of the claimed invention. The progression of drawings from FIG. 2 through FIG. 8 illustrates the structural components and steps involved in the installation of EFV 1 in such gas pipes and removal of the installation equipment after the installation.

As shown in FIG. 2, EFV 1 has a continuous cylindrical housing 10 made preferably of metal that has the same outer diameter throughout its length and a through hole 11 that has inner diameters over selected lengths of the housing 10 which are different from each other so as to support the different functions of housing portions 2, 4 of housing 10 discussed below.

Portion 2 extends over a length 6 of cylindrical housing 10 and houses conventional hardware 12 similar to that shown in U.S. Pat. No. 5,551,476 to control the opening and closing of an EFV valve therein. As hardware 12 is not an inventive feature of the present invention, it will not be addressed further.

Portion 4 extends over a length 8 of cylindrical housing 10 and is integrally formed as a unit with portion 2. Located within the length 8 of portion 4 is a laterally expandable wall 14. The inner diameter 16 of through hole 11 over the length of wall 14 is larger than inner diameter 18 located at opposite ends 15, 17 of portion 4. Thus, expandable wall 14 is thinner and more flexible than the wall of housing 10 located at opposite ends of portion 4.

Figure 4:
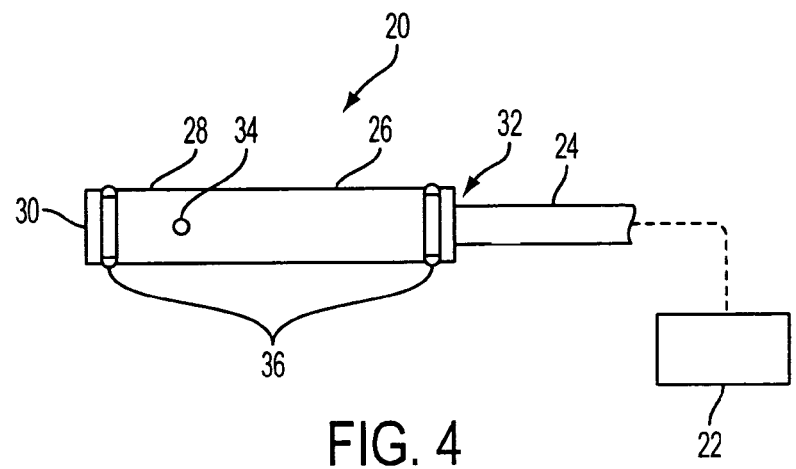
FIG. 4 shows an elevation view of the mandrel, fluid line and hydraulic pump.

FIG. 4 shows the installation equipment 20 which serves to locate and fix EFV 1 at a predetermined position in the service line downstream from the customer's gas meter. This equipment consists of a hydraulic pump 22, flexible fluid line 24, and a mandrel 26 designed for sealed engagement with opposite ends 15, 17 of portion 4.

Mandrel 26 comprises a cylindrical housing 28 a closed first end 30 and a second end 32 having an inlet engaged to an end of fluid line 24. The other end of fluid line 24 is engaged to hydraulic pump 22.

Housing 26 is closed with the exception of fluid outlet hole 34 and the inlet in its second end 32. Finally, elastic O-rings 36 are fixed to housing 26 near opposite ends 30, 32 so as to be spaced apart substantially the same distance as opposite ends 15, 17 of portion 4 of EFV 1.

Figure 5:
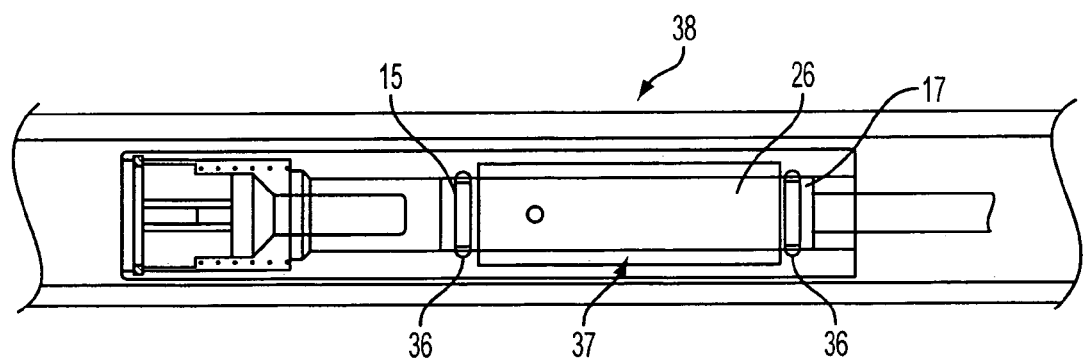
FIG. 5 shows an elevation view of the mandrel and fluid line of FIG. 4 inserted into the EFV of FIG. 2 in the service line prior to engagement of the EFV in the service line.

Retrofitting EFV 1 into an existing gas service line begins with inserting mandrel 26 into EFV 1 as shown in FIG. 5 so that O-rings 36 are respectively engaged to opposite ends 15, 17 of portion 4 to seal mandrel 26 in portion 4. This engagement creates an annular sealed space 37 and confined between mandrel 26 expandable wall 14. After mandrel 26 is engaged in EFV 1, they can be easily inserted into service line 38 as shown in FIG. 5 since the outer diameter of the engaged EFV 1 and mandrel 26 are smaller than that of the inner diameter of service line 38. The engaged EFV 1 and mandrel 26 can then be moved to a predetermined position in service line 38 by manipulation of flexible fluid line 24.

After the engaged EFV 1 and mandrel 26 have reached the selected position in service line 38, an operator can initiate operation of hydraulic pump 22 to force fluid through fluid line 24 into mandrel 26 and out fluid outlet hole 34 into sealed space 37. The pressure created by the influx of fluid into sealed and confined space 37 results in the lateral expansion of expandable wall 14 into fixed engagement with the inner wall of service line 38 as shown in FIG. 6.

Figure 3:
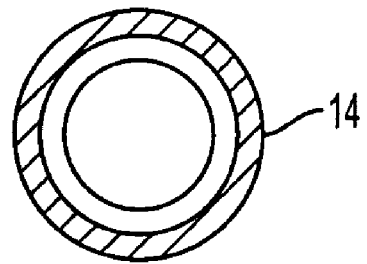
FIG. 3 shows a cross-sectional view along section line 3-3 of FIG. 2.
Figure 8:
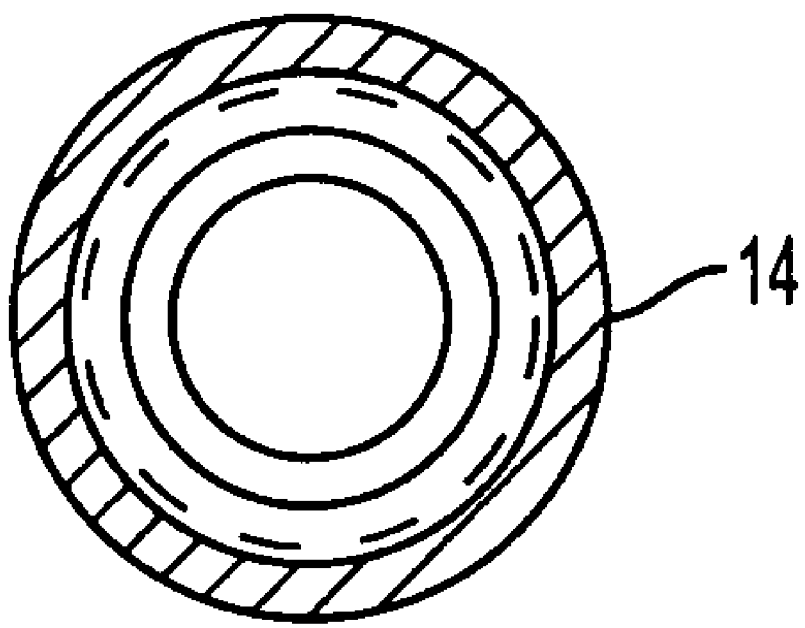
FIG. 8 shows a cross-sectional view along section line 8-8 of FIG. 6 with the service line not shown.

FIGS. 3 and 8 respectively show cross-sections of annular expandable wall 14 before and after its expansion by the fluid pressure created by hydraulic pump 22 in annular space 37.

Figure 6:
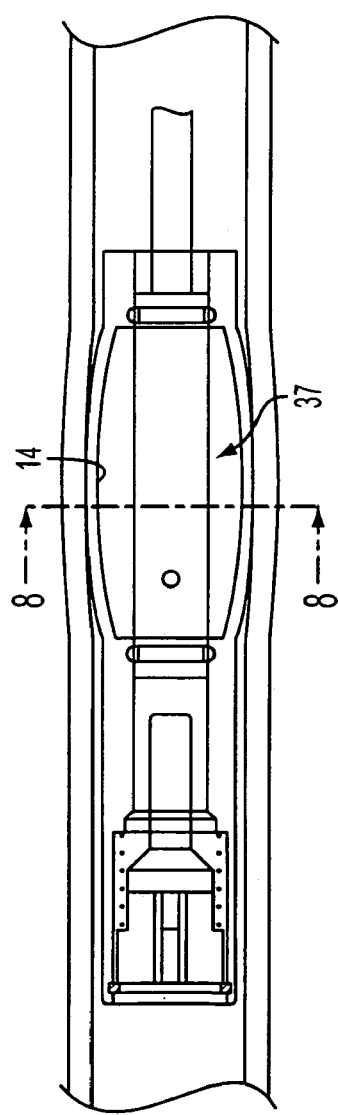
FIG. 6 shows the EFV of FIG. 5 expanded into engagement with the service line.
Figure 7:
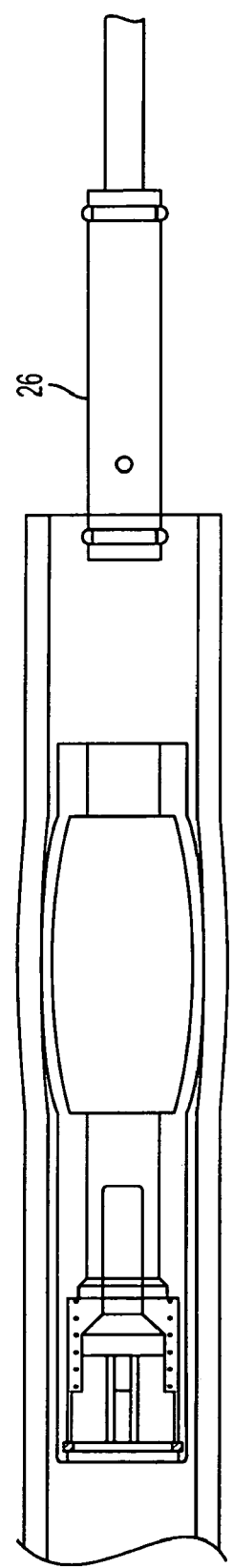
FIG. 7 shows the mandrel and fluid line of FIG. 6 withdrawn from the expanded EFV of FIG. 6.

After the operator is satisfied that EFV 1 has been successfully fixed in service line 38 by engagement of expandable wall 14 against the inner wall of service line 38 as shown in FIG. 6, the hydraulic pump 22 is turned off. This permits removal of mandrel 26 from the EFV 1 engaged in the service line by withdrawing the fluid line from the service line.

The foregoing description of the specific embodiments will so fully reveal the general nature of the invention that others can, by applying current knowledge, readily modify and/or adapt for various application such specific embodiments without undue experimentation and without departing from the generic concept, and, therefore, such adaptations and modifications should and are intended to be comprehended within the meaning and range of equivalents of the disclosed embodiment. It is to be understood that the phraseology or terminology employed herein is for the purpose of description and not of limitation. The means, materials, and steps for carrying out various disclosed functions may take a variety of alternative forms without departing from the invention.

Thus the expression "means to . . . " and "means for . . . ", or any method step language, as may be found in the specification and/or in the claims below, followed by a functional statement, are intended to define over whatever structural, physical, chemical or electrical element or structure, or whatever method step, which may now or in the future exist which carries out the recited function, whether or not precisely equivalent to the embodiment or embodiments disclosed in the specification above, i.e. other means or steps for carrying out the same function can be used; and it is intended that such expressions can be given their broadest interpretation.

The invention claimed is:

1. An excess flow valve (EFV) adapted to be installed in an existing service line of a natural gas distribution system, said EFV comprising:

a cylindrical housing having a first length and a second length and a through hole therethrough for passage of gas;

the EFV being engaged in said through hole of said first length; and an expandable wall forming part of said second length;

wherein when said expandable wall is expanded in the existing service line, the EFV is fixed and left entirely within said service line.

2. The excess flow valve according to claim 1, wherein said first length and said second length are integrally formed together as a unit.

3. The excess flow valve according to claim 1, wherein an annular wall at each end of said second length of said EFV housing is thicker than the expandable wall between the ends of said second length.

4. The excess flow valve according to claim 3, wherein said expandable wall is expanded and fixed by installation equipment engaged to said EFV after the engaged installation equipment and EFV are inserted into said service line.

5. The excess flow valve according to claim 4, wherein said installation equipment comprises a mandrel, fluid line and hydraulic pump which are all engaged together to deliver fluid under pressure to said mandrel.

6. The excess flow valve according to claim 5, wherein said mandrel includes a cylindrical housing engaged to said fluid line, said mandrel housing having a pair of O-rings respectively fixed at opposite ends thereof and a fluid outlet hole located between said O-rings.

7. The excess flow valve according to claim 6, wherein said O-rings of said mandrel are respectively fixed against the annular wall at each end of said second length so as to form a space between said expandable wall and said mandrel when said mandrel is engaged in said EFV.

8. The excess flow valve according to claim 6, wherein the diameter of said EFV housing, said mandrel housing and said fluid line are each smaller than that of said service line.

9. The excess flow valve according to claim 4, wherein the engaged installation equipment and EFV are inserted into the service line through a bypass tee at an inlet side of a gas meter of said natural gas distribution system.

10. The excess flow valve according to claim 6, wherein the pair of O-rings are spaced apart a distance substantially equal to that between the ends of said second length.

11. An excess flow valve (EFV) adapted to be installed in an existing service line of a natural gas distribution system, said EFV comprising:

a cylindrical housing having a first length and a second length and a through hole therethrough for passage of gas;

the EFV being engaged in said through hole of said first length; and an expandable wall forming part of said second length;

wherein said expandable wall can be expanded and fixed in said service line;

wherein an annular wall at each end of said second length of said EFV housing is thicker than the expandable wall between the ends of said second length, and wherein said expandable wall is expanded and fixed by installation equipment engaged to said EFV after the engaged installation equipment and EFV are inserted into said service line.

12. The excess flow valve according to claim 11, wherein said first length and said second length are integrally formed together as a unit.

13. The excess flow valve according to claim 11, wherein said installation equipment comprises a mandrel, fluid line and hydraulic pump which are all engaged together to deliver fluid under pressure to said mandrel.

14. The excess flow valve according to claim 13, wherein said mandrel includes a cylindrical housing engaged to said fluid line, said mandrel housing having a pair of O-rings respectively fixed at opposite ends thereof and a fluid outlet hole located between said O-rings.

15. The excess flow valve according to claim 13, wherein said O-rings of said mandrel are respectively fixed against the annular wall at each end of said second length so as to form a space between said expandable wall and said mandrel when said mandrel is engaged in said EFV.

16. The excess flow valve according to claim 13, wherein the diameter of said EFV housing, said mandrel housing and said fluid line are each smaller than that of said service line.

17. The excess flow valve according to claim 11, wherein the engaged installation equipment and EFV are inserted into the service line through a bypass tee at an inlet side of a gas meter of said natural gas distribution system.

18. The excess flow valve according to claim 13, wherein the pair of O-rings are spaced apart a distance substantially equal to that between the ends of said second length.

19. An excess flow valve (EFV) adapted to be installed in an existing service line of a natural gas distribution system, said EFV comprising:

a metallic cylindrical housing having a first length and a second length and a through hole therethrough for passage of gas;

the EFV being engaged in said through hole of said first length; and an expandable wall forming part of said second length;

wherein said expandable wall can be expanded and fixed in said service line; and wherein an annular wall at each end of said second length of said EFV housing is thicker than the expandable wall between the ends of said second length.

20. An excess flow valve (EFV) adapted to be installed in an existing service line of a natural gas distribution system, said EFV comprising:

a cylindrical housing having a first length and a second length and a through hole therethrough for passage of gas;

the EFV being engaged in said through hole of said first length; and an expandable wall forming part of said second length;

wherein when said expandable wall is expanded in the existing service line, the EFV is fixed and left entirely within said service line; and wherein said expandable wall is expanded and fixed by installation equipment engaged to said EFV after the engaged installation equipment and EFV are inserted into said service line.

21. An excess flow valve (EFV) adapted to be installed in an existing service line of a natural gas distribution system, said EFV comprising:

a cylindrical housing having a first length and a second length and a through hole for passage of gas therethrough;

the EFV being engaged in said through hole of said first length; and an expandable wall forming part of said second length;

wherein said expandable wall is formed of metal and is capable of and adapted to be permanently fixed in the service line by internal application of pressure.

22. An excess flow valve (EFV) fixed in place within an inner wall of an existing service line of a natural gas distribution system, said EFV comprising:

a cylindrical housing having a first length and a second length and a through hole therethrough for passage of gas;

the EFV being engaged in said through hole of said first length; and an expanded wall of said cylindrical housing forming part of said second length and retained in fixed frictional contact against the inner wall of said service line, said expanded wall having been expanded outwardly by internal pressure.

23. A method for installing an excess flow valve in an existing service line of a natural gas distribution system, wherein the excess flow valve has a passageway for passage of gas therethrough, the excess flow valve being engaged in a through hole of a first length of a cylindrical housing, and the cylindrical housing having an expandable wall forming a part of a second length thereof, the expandable wall of the housing being capable of being expanded and fixed within the service line, the method comprising:

extending the cylindrical housing with the excess flow valve therewithin into the service line of the natural gas distribution system serving an existing structure; and causing the expandable wall forming part of the second length of the cylindrical housing to expand outwardly by application of internal pressure so as to firmly frictionally engage the interior wall of the service line so as to fix and leave the EFV in the service line.

24. The method of claim 23, wherein the expandable wall of the second length of the cylindrical housing is caused to expand by delivering fluid under pressure thereto.

25. The method of claim 23, wherein the cylindrical housing with the excess flow valve therewithin is forced to a position within the service line by use of a mandrel.

26. A method according to one of claims 23 through 25, wherein the location in the service line into which the cylindrical housing with the excess flow valve therein is delivered is underground.

27. The method of claim 23, wherein the service line has a bend therein and the cylindrical housing with the excess flow valve therewithin is forced around the bend and downstream therefrom to the location at which the expansion takes place.

* * * * *